June 7, 1927. 1,631,203
H. K. HITCHCOCK
PLATE GLASS TRANSFER AND LAYING APPARATUS
Filed March 27, 1924   10 Sheets-Sheet 9
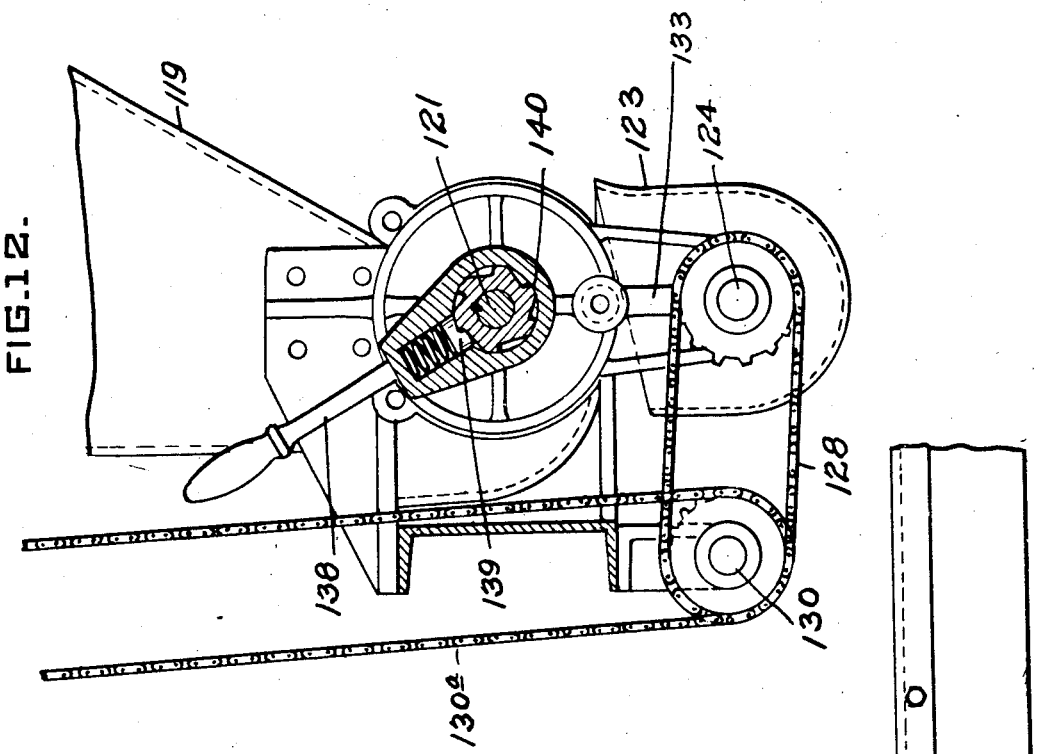
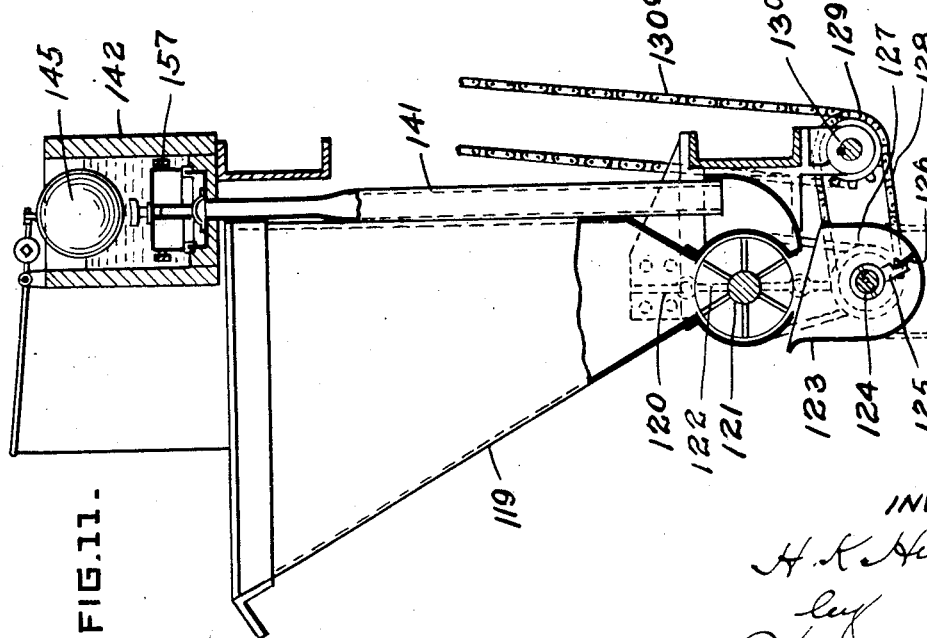
INVENTOR
H. K. Hitchcock
by
James C. Bradley
Atty.

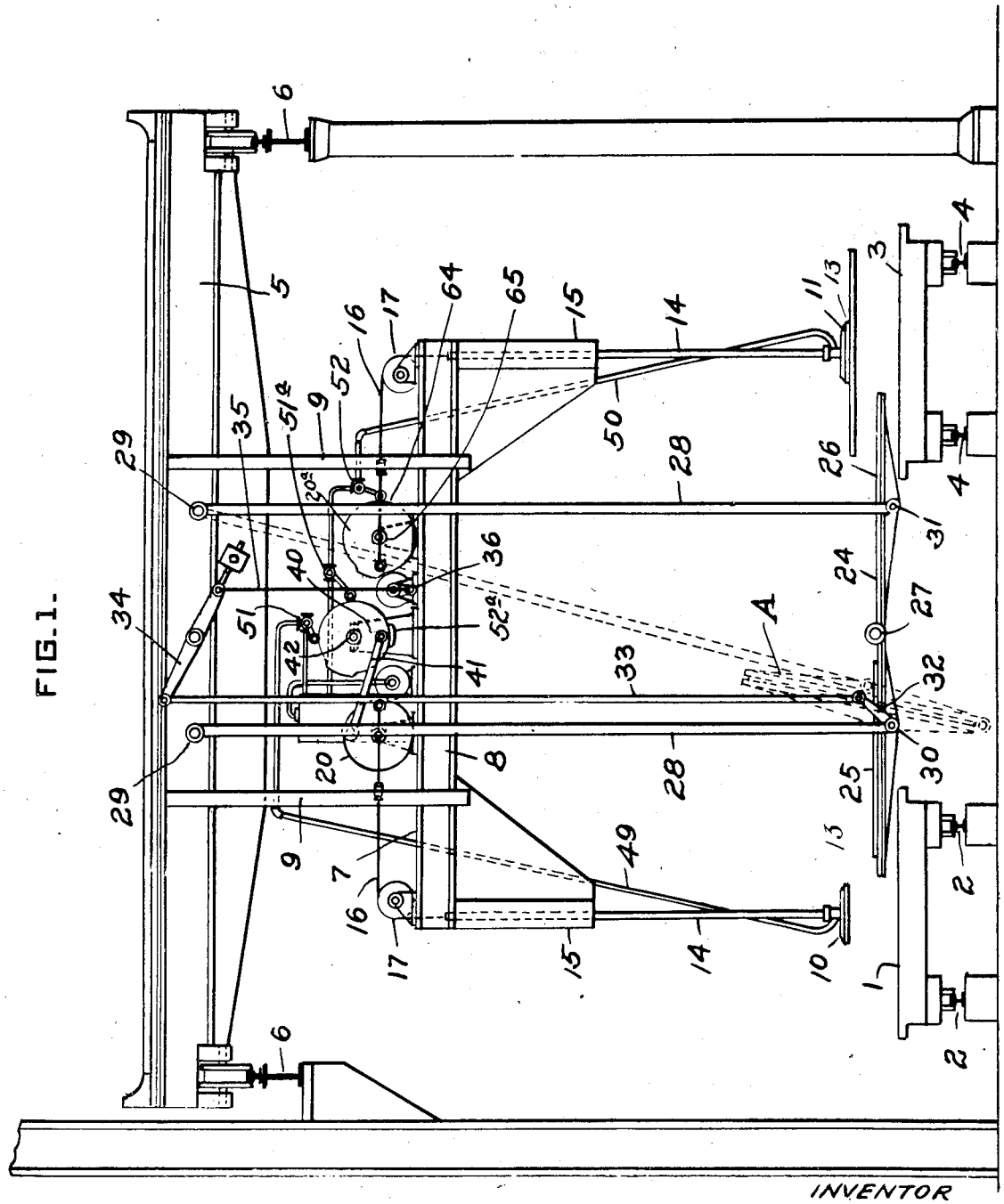

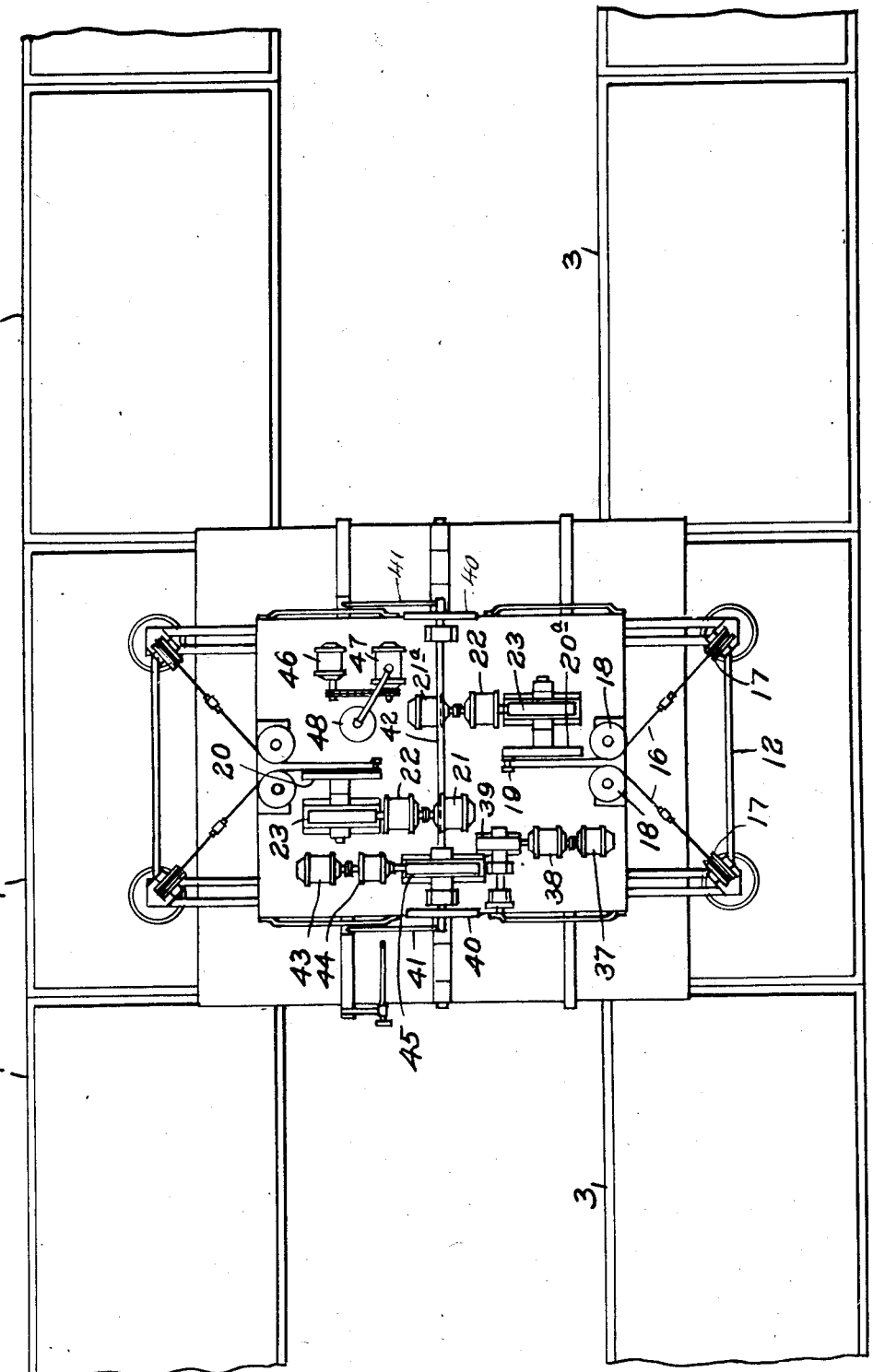

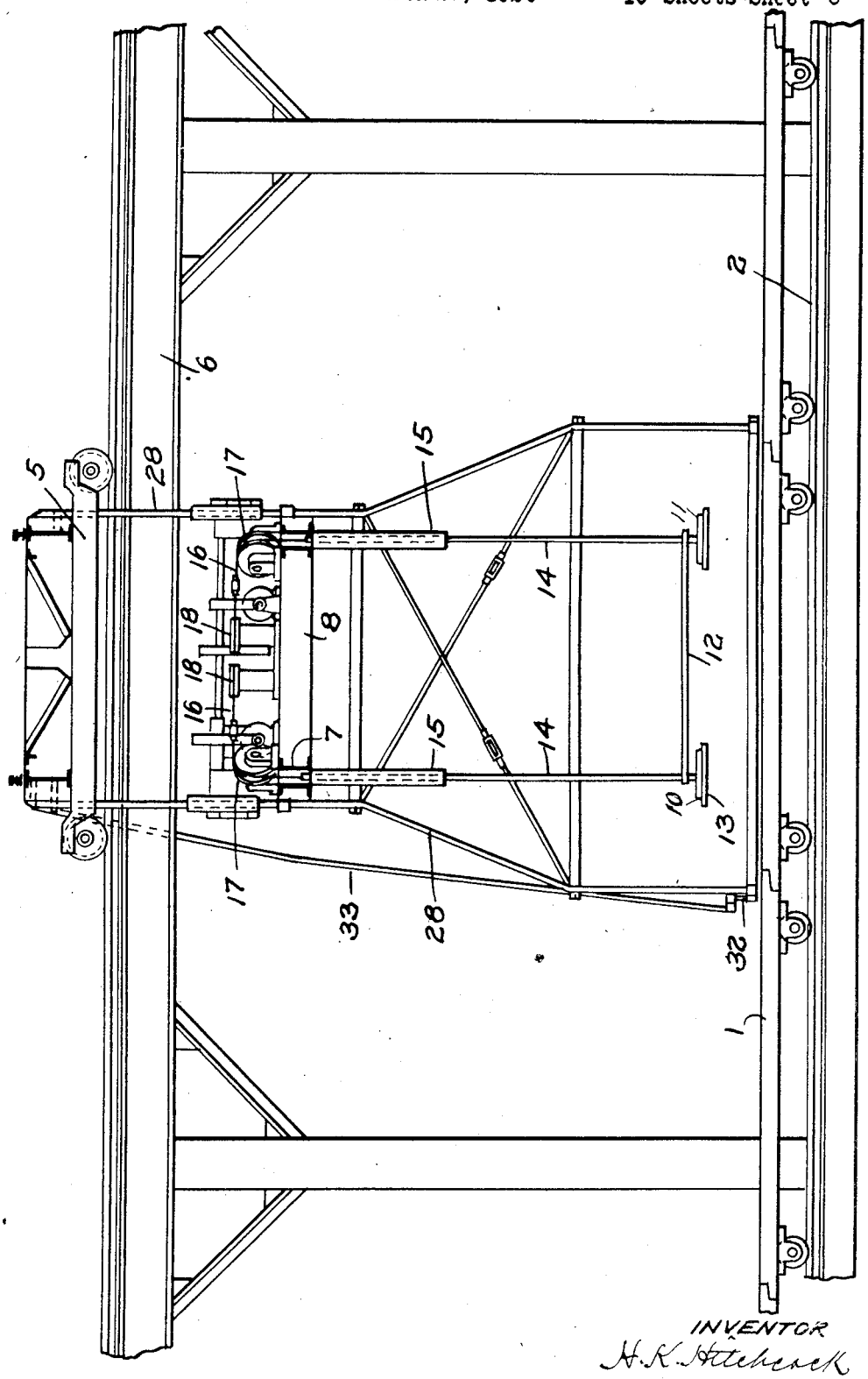

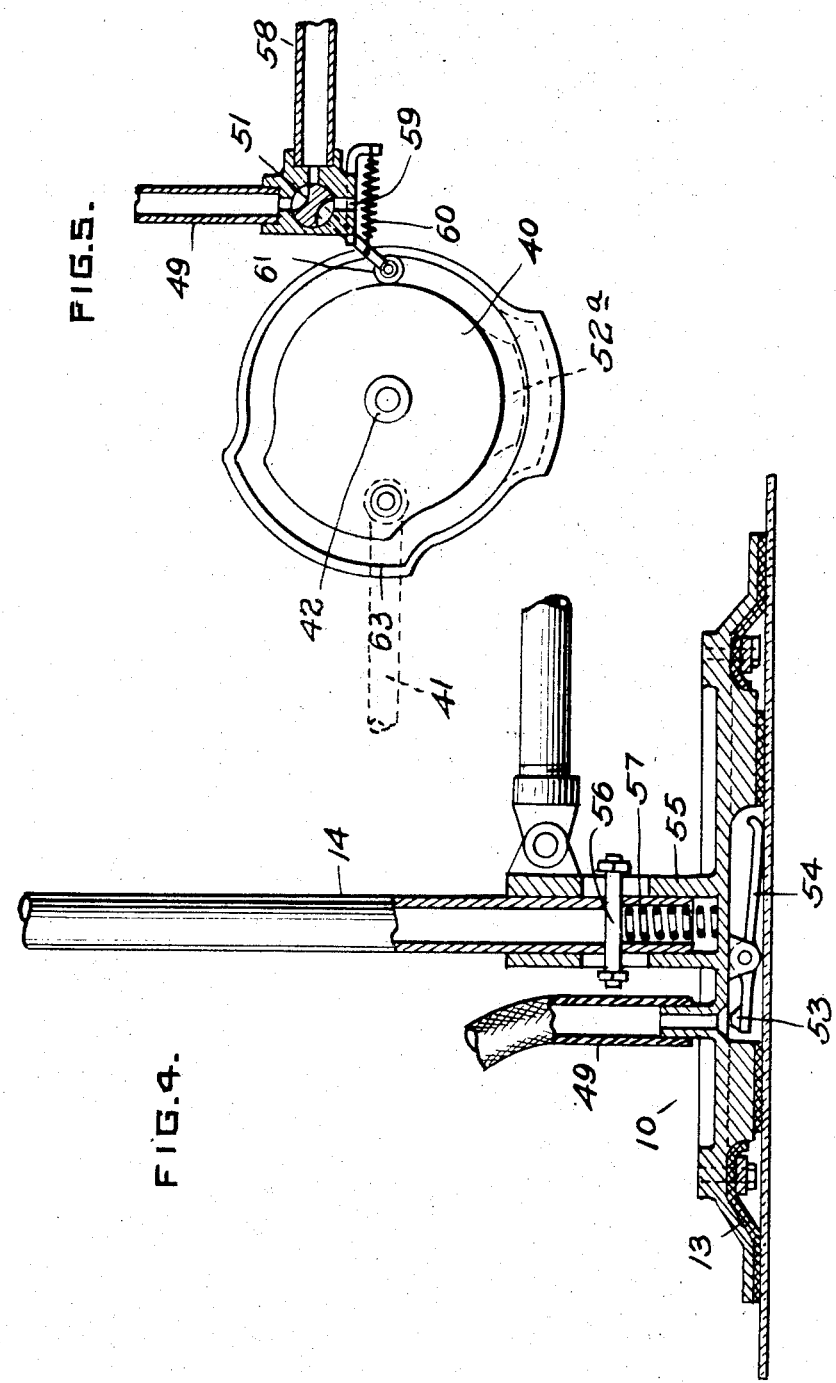

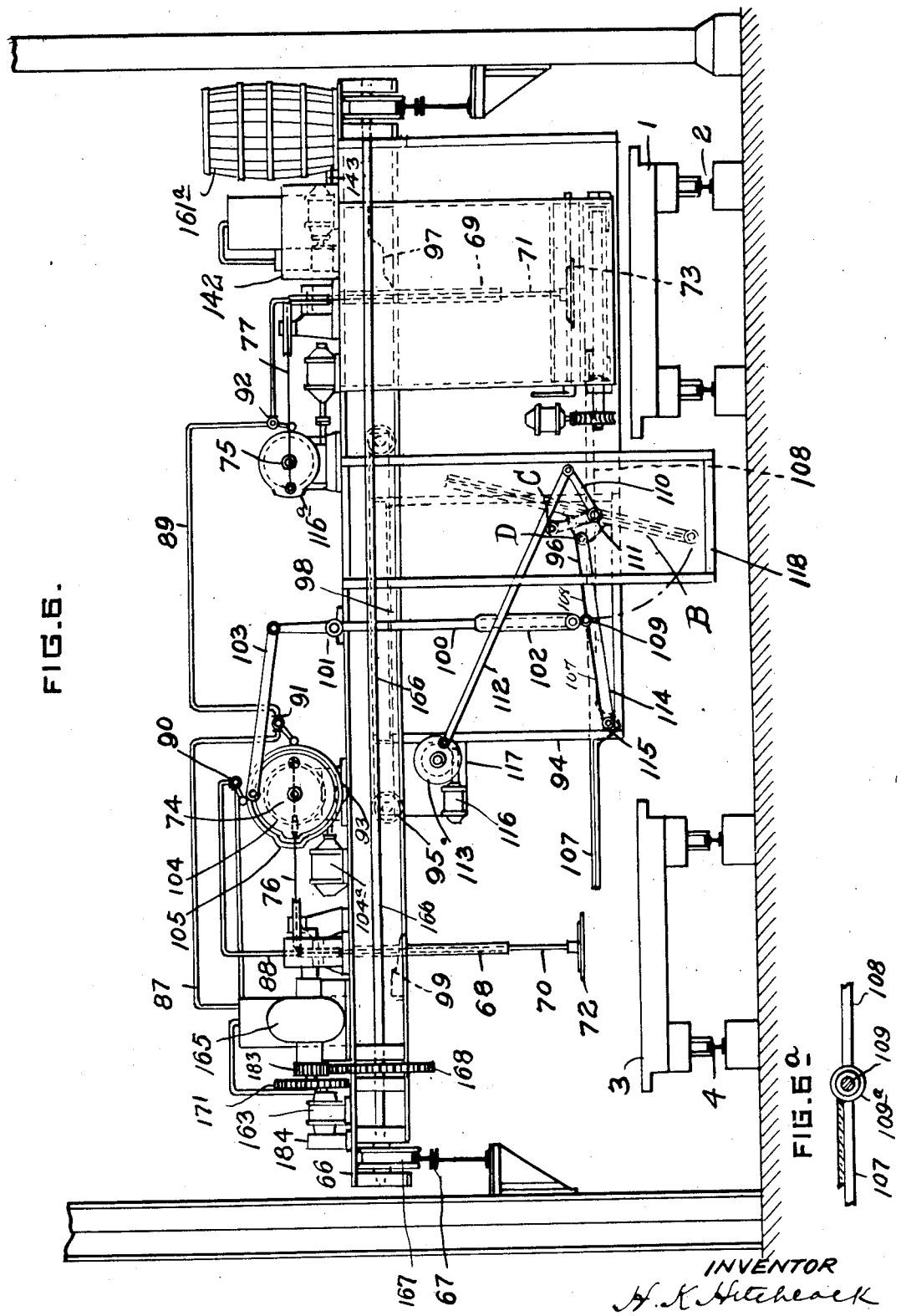

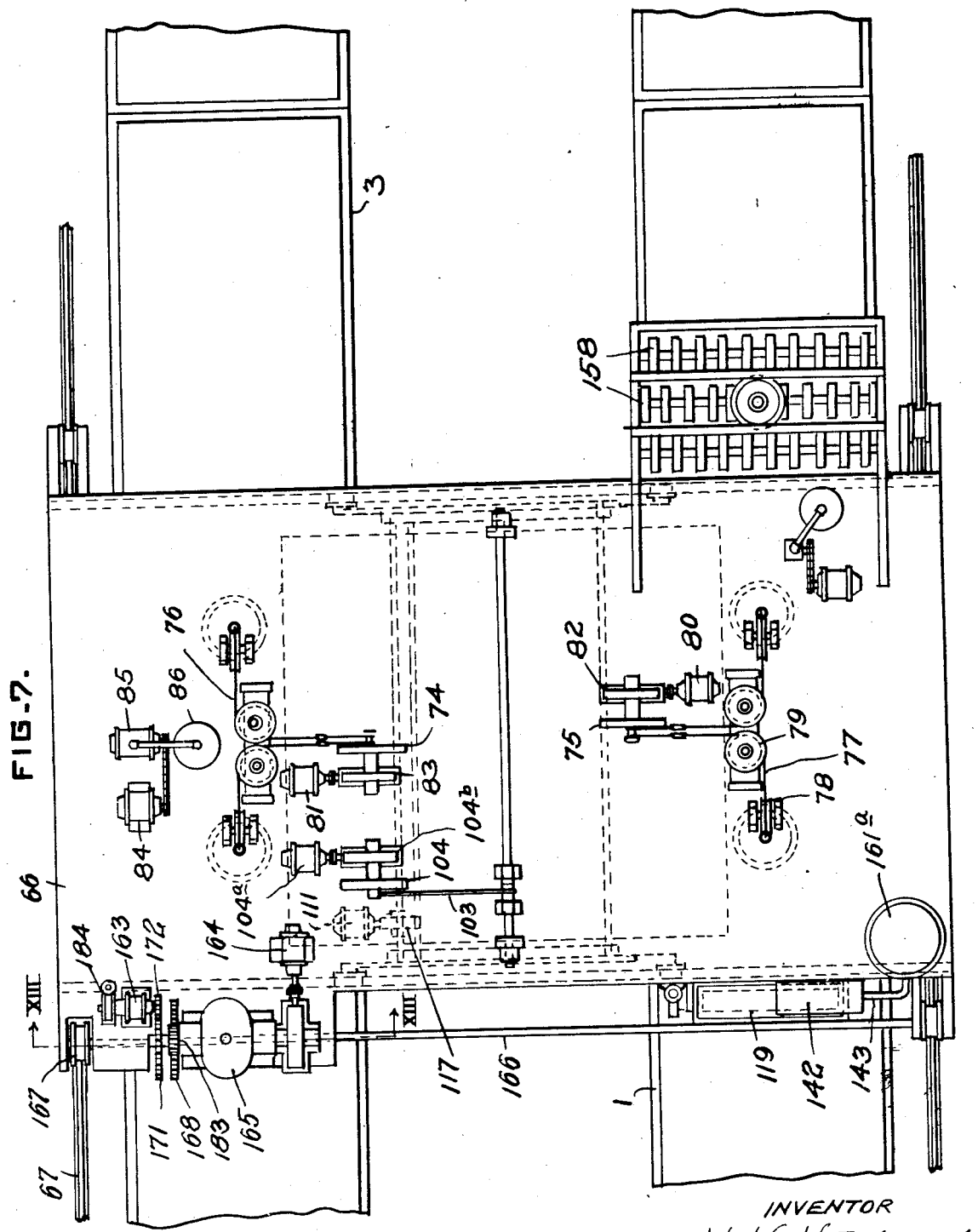

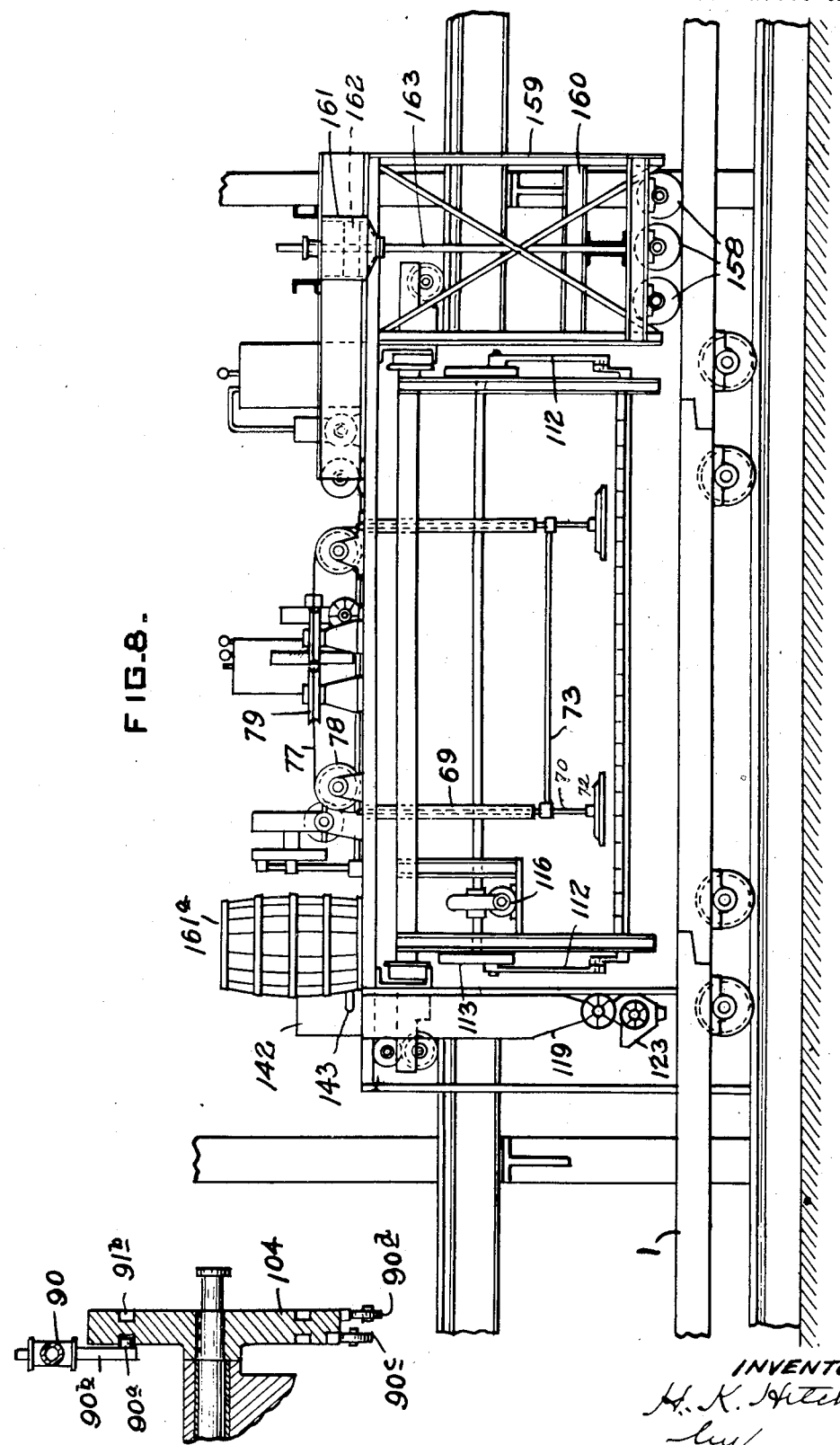

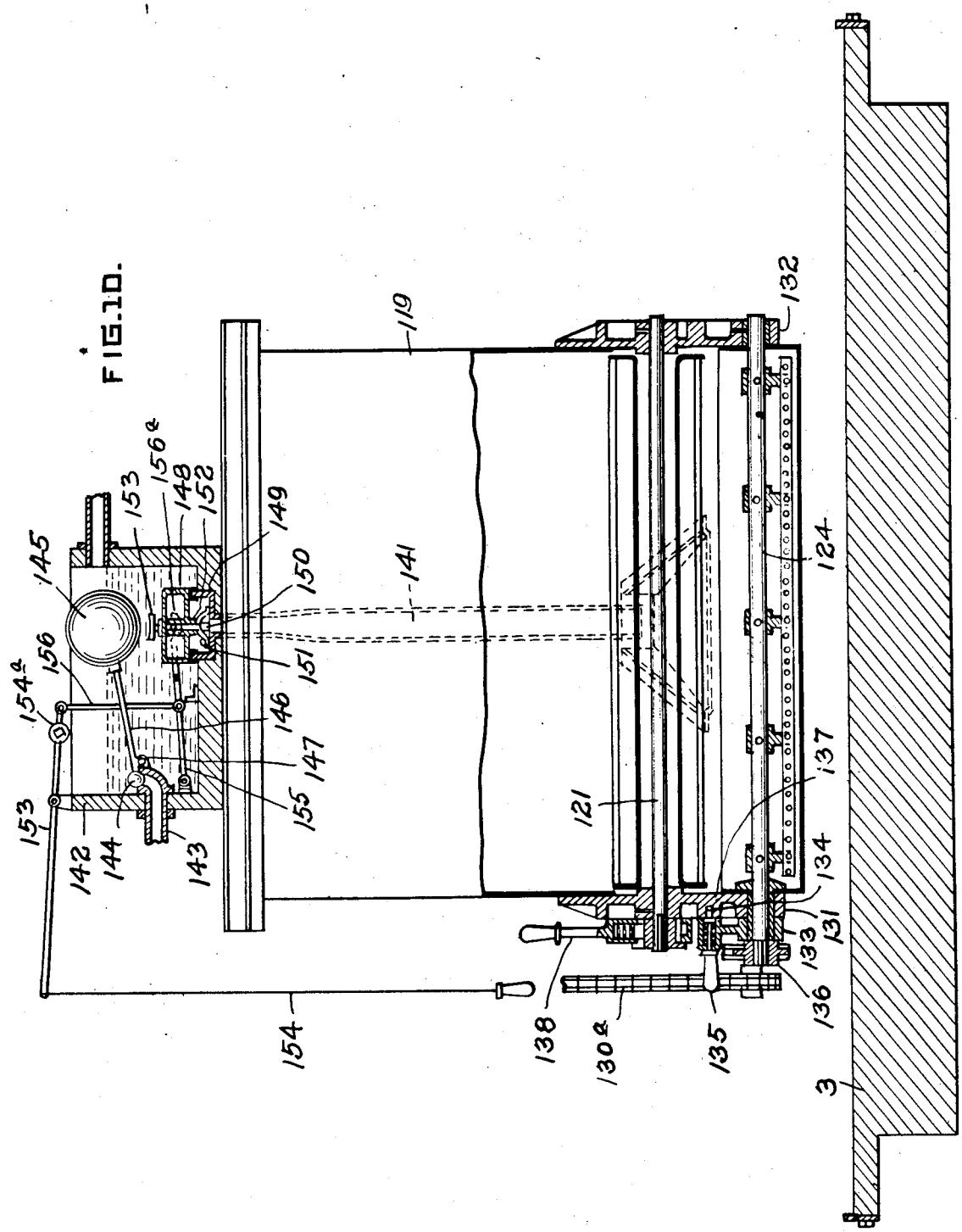

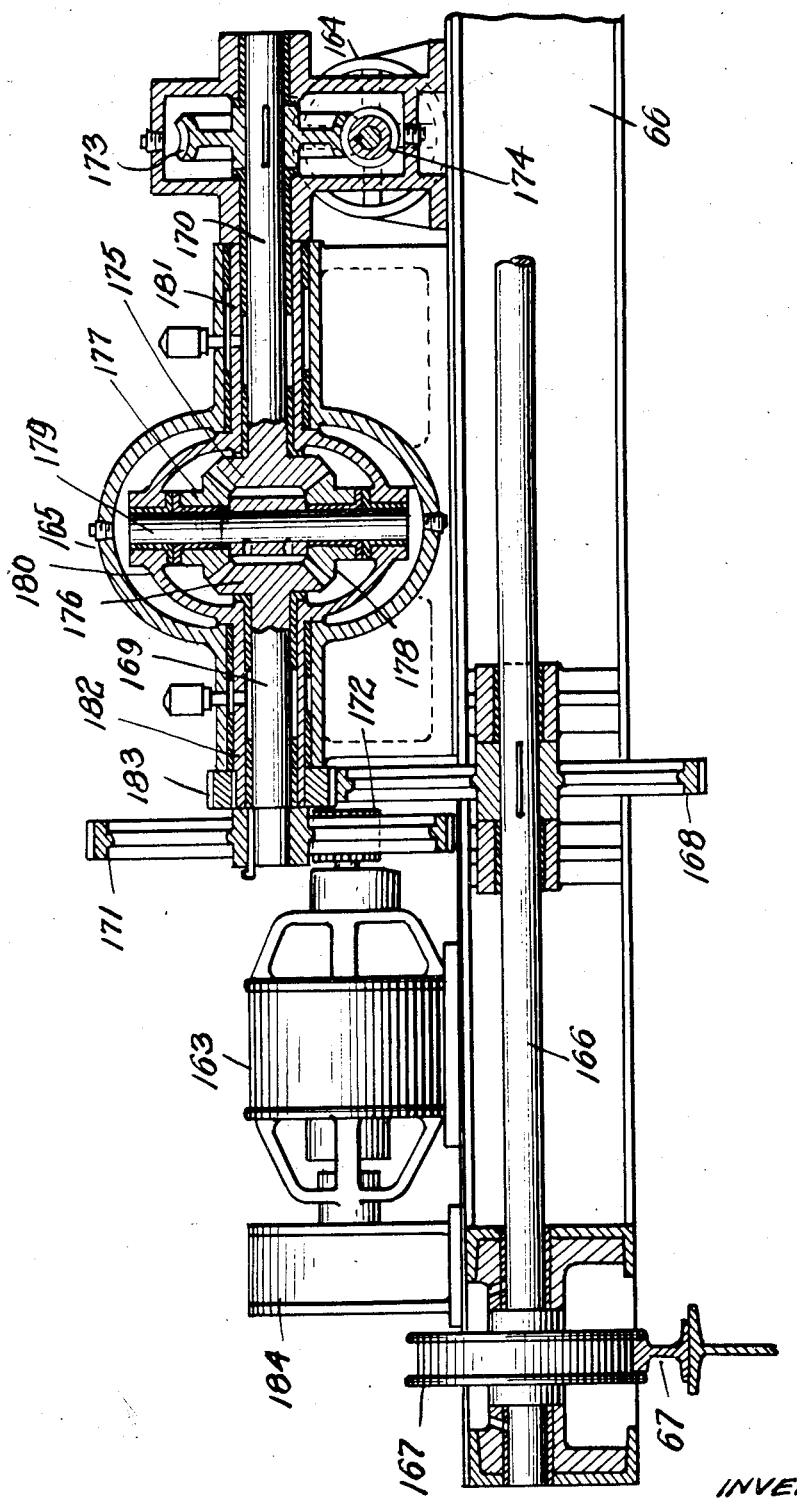

Patented June 7, 1927.

1,631,203

UNITED STATES PATENT OFFICE.

HALBERT K. HITCHCOCK, OF PITTSBURGH, PENNSYLVANIA, ASSIGNOR TO PITTSBURGH PLATE GLASS COMPANY, A CORPORATION OF PENNSYLVANIA.

PLATE-GLASS TRANSFER AND LAYING APPARATUS.

Application filed March 27, 1924. Serial No. 702,260.

The invention relates to apparatus for turning over and transferring glass plates which have been ground and polished on one side. It also relates to means for "laying" the glass sheets in plaster after they have been turned over to bring the rough unsurfaced sides of the plates uppermost. The apparatus is designed particularly for picking up glass sheets from a series of cars or carriers upon a track, turning them over, carrying them to other cars or carriers upon a track, turning them over, carrying them to other cars or carriers on a second parallel track and "laying" the glass upon such cars or carriers. The invention has for its principal objects the provision of improved apparatus or mechanism for accomplishing the foregoing operations rapidly and with entire safety to the operators and to the glass handled. Also the provision of improved apparatus of the type specified which may be easily operated by a single workman by the mere manipulation of electric controls, including the application of plaster to the carriers and the laying of the glass, so that the labor cost is reduced to a minimum, and the work accomplished with such ease on the part of the workman that he may exercise a high degree of care so that unnecessary breakage, such as is often incident to haste and exertion, is avoided. The foregoing and other advantages are secured by the apparatus, two embodiments of which are illustrated in the accompanying drawings wherein:

Figures 1, 2 and 3 are end, plan and side elevation views respectively of one form of apparatus. Figs. 4 and 5 are enlarged detail views of parts of the construction of Figs. 1, 2 and 3, Fig. 4 being an enlarged section through one of the suction cups and Fig. 5 showing a section through the valve for controlling the suction. Figs. 6, 7 and 8 are end, plan and side elevation views respectively of a modified type of construction. Fig. 6ª is a detail section at the hinge of the turnover frame. Fig. 9 is an enlarged section through the crank disc controlling the vacuum release. Figs. 10, 11 and 12 are detail sections of the plaster mixer. And Fig. 13 is a section on the line XIII—XIII of Fig. 7.

Referring to Figs. 1, 2 and 3, the reference numerals 1, 1, 1 indicate a series of cars or carriers mounted upon a track 2 and carrying the glass which has been ground and polished on one side in a straight away operation. 3, 3, 3 are a similar series of cars or carriers mounted upon a track 4, which is parallel to the track 2 and to which the sheets of glass from the cars 1 are to be transferred for the grinding and polishing of the rough unsurfaced sides. The apparatus which will now be described is designed for lifting the glass sheets from the cars 1, turning them upside down to bring the rough sides up, and placing them upon the tables 3 where they are seated in plaster preliminary to the grinding and polishing of the rough sides which are now uppermost.

Mounted for movement longitudinally of the tracks 2 and 4 is a crane 5 mounted upon the track 6 and having suspended therefrom the platform 7. This platform has a framework consisting of the girders 8 to which are attached the channel bars 9 by means of which the platform is suspended. Mounted above the cars 1 and 2 are the vacuum frames 10 and 11, preferably of very simple form and each made up of a tie rod 12 and a pair of suction cups 13, as indicated in Fig. 3. Each vacuum frame is supported for vertical movement from the platform by means of a pair of vertical pipes 14, 14 slidably mounted in guides 15, 15, depending from the platform. The upper ends of these pipes are connected to cables 16, 16 which pass around sheaves 17, 17 and 18, 18 and are connected at their other ends to crank pins 19 carried by the crank discs 20 and 20ª. These crank discs are operated from the motors 21 and 21ª through the intermediary of suitable reduction gearing in the casings 22, 22 and the worm gearing in the casings 23, 23.

Supported between the tracks 2 and 4 is the transfer turnover frame or table 24 made in two parts 25 and 26 and hinged together at 27, the support for the table being provided in the form of four hangers 28 pivoted at their upper ends to the crane at 29 and at their lower ends to the table at 30 and 31, thus providing a parallel link support for the table which maintains it in horizontal plane when it swings laterally. Extending transversely of the table section 25 at 30 is a shaft which is keyed to such section and has a crank 32 for swinging the table sections to the closed position marked A in dotted lines in Fig. 1. The crank is operated by a connecting rod 33, secured at its upper end to the counter weighted lever 34. This lever is connected by means of the rod 35 with a crank 36, and this crank is rotated from the motor 37, mounted upon the platform through the intermediary of suitable reduction gearing in the casing 38 and a worm and worm wheel in the casing 39 (Fig. 2). When the motor is operated to swing the crank 32 downward, through an arc of approximately 90 degrees, the table folds to the position indicated in dotted lines, such position lying slightly to one side of the vertical, so that when the table is again opened, the glass sheet which before rested on the section 25, will now rest upon the section 26 with its rough face, which had previously been facing down, now facing up.

In order to swing the turnover table back and forth so that at one time the section 25 lies beneath the vacuum frame 10 and at another time the section 26 lies beneath the vaccum frame 11, the crank discs 40 and connecting rods 41 are employed, the crank discs being carried by the shaft 42 which is driven from the motor 43 through the intermediary of the reduction gearing in the casing 44 (Fig. 2) and the worm and worm wheel in the casing 45.

A vacuum producing unit is also carried by the platform and includes a motor 46 (Fig. 2), a pump 47 operated therefrom and a tank 48 to which the vacuum cups are connected by means of the flexible pipes 49 and 50, suitable controlling valves 51 and 52 being provided in the line of connection between the cups and the vacuum tank. The line leading to the vacuum frame 11 also includes a vacuum check valve 51ª normally held closed, but adapted to be opened by the projection 52ª carried by the crank disc 40 when the turnover table 24 is in its extreme position to the right with the section 26 beneath the vacuum frame 11. These valves are normally open, but a closure is made at each of the vacuum cups as indicated in Fig. 4, this being accomplished by means of a valve 53 adapted to seat in the opening at the lower end of the connection 49. This valve is normally held closed by the weight of the handle 54, or if desired, by means of a spring. Also, as indicated in this figure, the cup 13 is provided with a sleeve portion 55 fitting slidably over the lower end of the pipe 14 with a lost motion connection in the form of a bolt 56 secured to the pipe 14 and slidable in slots in the sleeve 55. A coil spring 57 serves to take up the lost motion. The use of this yieldingly supported cup reduces the danger of breakage incident to the movement of the cups into contact with the glass sheets.

The valve 51 by means of which the vacuum is released from the cups carried by the frame 10 is illustrated in Fig. 5. The valve is of the three way type with the pipe 58 leading to the vacuum tank, the pipe 49 leading to the cups of the frame 10 and the passage 59 leading to the atmosphere. The valve is normally held in the position illustrated by means of the compression spring 60 which holds the roller handle 61 of the valve against the crank disc 40 carried by the shaft 42 operated as heretofore explained. The valve remains in the position illustrated so that a vacuum is applied to the cups until the high portion 63 of the cam reaches the roller, when the handle is turned to bring the pipe 58 into communication with the passage 59, thus releasing the vacuum so that the glass plate is disengaged from the cups. The valve 52 which controls the vacuum cups carried by the frame 11 is similarly controlled by means of the other cam disc 20ª carried by the shaft 63 which is rotated by the motor 21ª (Fig. 2), which as heretofore explained, raises and lowers the vacuum frame 11.

The motors are all controlled by the operator from any convenient point where suitable switch mechanism is located, motor control devices and switch mechanism being preferably employed of a type which requires the operation of the motors in their proper sequence with interlocking devices so arranged as to prevent an actuation of the motors in any sequence but the proper one.

Starting with the parts in the position illustrated in Fig. 1, except that the table 24 is to the right of the position shown so that the section 25 does not lie over the car 1, and with the glass sheets finished on one side on the cars 1, to be transferred from such cars to the cars 2 and turned over in transit, the operation is as follows: The motor 21 which controls the vertical movement of the frame 12 is started, thus rotating the crank disc 20 and lowering the frame so that the cups engage the surface of the glass. Just as the cups engage the glass, the engagement of the glass with the handles 54 (Fig. 4) of the valves 53, open such valves so that the suction is applied to the cups, thus securing the attachment of the cups to the glass sheet. The continued rotation of the disc 20 lifts the frame 10 to its starting position as indicated in Fig. 1. The motor 43, which operates the shaft 42 for swinging the hangers 28, is now started so as to turn the crank disc 40 in a clockwise direction, thus swinging the table 24 to the left so that the section 25 is brought beneath glass sheet carried by the frame 10 and up against the lower side of such sheet since the section 25 moves upwardly as well as laterally. At this time, the high part 63 on the cam disc 40 (Fig. 5) engages the roller on the handle 61 of the valve 51 swinging such valve so that the pipe 58 is connected to the passage 59, thus releasing the vacuum from the cups and freeing the vacuum frame from the sheet so that the glass now rests upon the turnover section 25. The turnover frame is now brought to its central portion, as indicated in Fig. 1, and the crank 32 is operated from the crank 36 driven by the motor 37 to fold the turnover frame as indicated at A in Fig. 1, after which the frame is unfolded by a reverse rotation of the crank to bring the frame to open position with the sheet of glass resting on the section 26 with its rough face uppermost. A further rotation of the crank disc 40 carries the turnover table or frame in open position beneath the vacuum cup 11 and into engagement with the suction cups. This engagement actuates the valves 53 (Fig. 4) as heretofore explained so that vacuum is applied to the cups to support the sheet. The crank disc 40 is now rotated still further to carry the turnover frame from beneath the glass sheet supported by the vacuum frame 11 and the crank disc 20ª which moves the vacuum frame 11 up and down is rotated in a clockwise direction from the position in Fig. 1 to lower the vacuum frame 11 and the glass supported thereby onto the car 3. This brings the high part on the crank disc 20ª into position to operate the handle of the valve 52 which corresponds to the construction of the valve 51 of Fig. 5, thus securing a release of the glass from the vacuum frame. Just before the glass sheet engages the cups on the vacuum frame 11 and opens the check valves therein to cause the application of suction to the cups, the check valve 51ª and its operating projection 52ª on the cam disc 40 come into play. The engagement of the plate with the check valves 53 and the vacuum cups, might occur before the table section 26 is in its extreme right hand position, in which case the vacuum frame would not be properly centered with respect to the sheet, and the sheet itself would not be properly positioned upon the table 3, and the valve 51ª is provided to keep the vacuum line closed so that suction will not be applied to the cups until the table section is in its extreme right hand position. When the plate reaches its extreme right hand position, the crank 40 is at a position 270 degrees from the position illustrated in Fig. 1, which brings the projection 52ª under the roller of the handle of the valve 51ª so that at this time, the check valve is opened. The engagement of the glass with the check valves in the vacuum cups now permits the application of suction to the cups, and the succeeding steps of the operation are carried out as heretofore described. This completes the cycle of operation and the crane 5 may be moved along the tracks 2 and 4 to a position for transferring another sheet from one of the cars 1 to one of the cars 3, or the cars themselves may be moved along to bring another pair of cars into position beneath the vacuum frames.

Figs. 6, 7 and 8 illustrate a modification of the apparatus of Figs. 1, 2 and 3. The operations performed by this apparatus are the same as those performed by the other type of construction but the mechanical arrangement is somewhat different and requires less head room than the apparatus of Figs. 1, 2 and 3. This apparatus also includes means for mixing and applying plaster to the cars preliminary to laying the sheets which have been turned over and apparatus for rolling the glass sheets into the plaster so that much of the hand labor incident to the laying of the glass is avoided. The apparatus for mixing and applying the plaster and for rolling the glass sheets into the plaster might also be applied to the apparatus of Figs. 1, 2 and 3. Referring now to the drawings, 66 is a platform mounted upon a track 67 extending longitudinally of the tracks 2 and 4 upon which are mounted the cars or carriers 1 and 3 as in the first type of construction. Carried by the framework of the platform 66 are a pair of guide frames 68 and 69 in which are mounted the pipes 70 and 71 constituting the supporting framework of the vacuum frames 72 and 73 located over the cars. These vacuum frames are raised and lowered by means of crank discs 74 and 75 connected to cables 76 and 77 passing around the sheaves 78 and 79 (Fig. 7). The crank discs themselves are rotated from the motors 80 and 81 operating through reducing gearing in the casings 82 and 83. As in the other type of construction, a vacuum producing unit is mounted upon the platform and includes the motor 84, the pump 85 and the tank 86 connected to the vacuum cups by means of the piping 87, 88 and 89 provided with the valves 90, 91 and 92. The valves 90 and 92 are vacuum release valves corresponding in function to the valves 51 and 52 of Fig. 1, while the valve 91 is a vacuum check valve corresponding in function to the valve 51ª of Fig. 1.

Mounted for movement transversely of the cars is the trolley frame 94 having the wheels 95 which engage a suitable track carried by the framework of the platform 66. This trolley frame carries the turnover table 96, and corresponds in function to the swinging framework 28 of the Fig. 1 construction. In order to move the turnover table vertically when it comes under the vacuum frames 72 and 73, the track on which the wheels 95 are mounted is provided with the raised portions 97, 98 and 99. The trolley frame 94 is moved back and forth to bring the turnover table beneath the two vacuum frames by means of the lever 100 pivoted at 101 to the platform framing and having its lower end pivoted to a slide 102 guided for vertical movement in a guideway carried by one of the members of the trolley frame 94. The other end of the lever is swung back and forth by means of the connecting rod 103 connected to the crank disc 104 operated from the motor 104ª with an interposed gear reduction in the casing 104ᵇ. This disc also carries the cam 105 for opening the vacuum release valve 90 and the cam 93 for operating the vacuum check valve 91. The operation of the lever 100 moves the turnover table 96, so that in one extreme of movement, the section 107 of the table lies beneath the vacuum frame 72, while in another extreme of movement the other sections 108 of the table lies beneath the vacuum frame 73. The two halves of the table are pivoted together at 109, and the full lines in Fig. 1 show the table in open central position, while the dotted lines at B indicate the table in folded position, the table and its method of operation being similar to that of the Fig. 1 construction. The section 108 of the table carries a crank 100, the crank 110 being connected by means of the connecting rods 112 with the crank discs 113. The section 107 has mounted on its lower side a transverse shaft carrying at its ends the rollers 115, mounted in the guide slots 114 in the side plates of the frame 94. The crank discs 113 are driven from the motor 116 through the intermediary of suitable reduction gearing, the motor and operating parts being all seated upon a bracket 117 carried by the trolley frame 94. The section 108 of the table has secured across its lower side the shaft 111 mounted at its ends in the side plates of the frame 94. The rotation of the crank disc 113 through approximately 180 degrees brings the crank 110 to the dotted line position marked C, thus rotating the table sections to the position marked B and closing such sections with the rollers 115 at the right hand end of the guide slots 114 as indicated in dotted lines at D. The slots 114 during such movement serve to guide the section 107 laterally, while the pivotal connection 109 between the two table sections is swung downward to the position indicated in dotted lines. This movement brings the frame past a vertical position, so that when it is opened by reversing the motor 116, the glass sheet will rest upon the section 108 with its rough side, which was formerly down, facing up. As indicated in Fig. 6ª, felt washers 109ª are mounted on the shaft 109 to support the edge of the glass sheet 109ᵇ during the closing movement of the frames 107 and 108, thus protecting such edge from injury.

The vacuum release valve 92 for the cups on the frame 73 is operated from the cam 116ª carried by the crank disc 75, while the vacuum check valve 91 is operated from the cam 93. The check valve 91 corresponds in function to the check valve 51ª of the Fig. 1 construction and is operated by the cam 93 to open the vacuum line, when the turnover table moves beneath the vacuum frame 73. Fig 9 shows in detail the crank disc 104 carrying the crank 74 and provided with a cam groove in which rides the roller 90ª on the handle 90ᵇ of the vacuum release valve 90 heretofore described. It will be understood that the cam recess in which the roller rides corresponds in contour to the cam 105 shown in Fig. 6, such cam being shown in Fig. 6 in diagrammatic form, which is more readily illustrated upon the small scale to which Fig. 6 is drawn. The cam disc 75 also has its periphery provided with cam surfaces engaged by the rollers 90ᶜ and 90ᵈ which operate limit and interlocking switches for insuring the control of the motors so that they will operate in proper sequence. The roller on the handle of the check valve 91 rides in a second groove 91ᵇ which has the offset 93 (Fig. 6) by which it is operated as heretofore described. The electrical control and the arrangement of the switches is a matter of detail design not shown, but whose application will be readily understood by those skilled in the art, the limit switches, interlocking devices, and motor controls being standard devices well known in the electrical art.

The operation in so far as the lifting of the glass from the table 1, turning it over, and laying it upon the table 3, is the same throughout as heretofore described in connection with the Fig. 1 construction, the operation being controlled from an operator's platform 118 carried by the trolley frame and the operating switches for the various motors being so controlled and interlocked that the proper sequence in stopping and starting the motors is secured.

The present type of apparatus also includes means for applying plaster to the tables 3 preliminary to laying the glass thereon and means for rolling the glass into the plaster, and these two sets of mechanism are preferably mounted upon the platform, as indicated in Fig. 8, on opposite sides of the vacuum frame 73, the arrangement being such that after the platform carrying the plaster applying apparatus is moved longitudinally of the table 3 to apply a layer of plaster thereto, the turnover table and vacuum frame 73 may be moved to the position as indicated in Fig. 8 and the glass sheet lowered into the plaster, after which a movement of the platform to the left carries the rolling apparatus over the sheet of glass to press it down uniformly so that its upper side lies in a substantially horizontal plane.

The plaster mixing and applying device is illustrated in Figs. 10 and 11. This apparatus includes a hopper 119 provided at its lower end with a discharge outlet 120 leading to a rotary valve. This valve comprises a shaft 121 mounted for rotation and carrying a plurality of pockets 122, which are filled in turn as the valve is rotated step by step. Beneath the valve is an upwardly opening trough 123 mounted for tilting movement around the shaft 124. The shaft 124 also carries a stirring and cleaning paddle 125 having a rubber lip 126 which presses yieldingly against the interior surface of the trough. The shaft is provided at its end with a sprocket 127 and this sprocket is rotated by the chain 128 passing around a sprocket 129 on the shaft 130. The shaft 130 is driven from any suitable source of power by means of the sprocket chain 130ª. The trough 123 is supported for rotation on the shaft 124 by means of the sleeves 131 and 132 and the sleeve 131 has keyed thereto an arm 133 held in the position illustrated in Figs. 10 and 12 by means of the latch 134 having a retracting handle 135 and a spring 136 normally pressing the latch forward into a recess in the housing 137. When it is desired to discharge the trough to the table, the latch 134 is pulled outward and the trough swung around 180 degrees to the dotted line position indicated in Fig. 11. The valve 122 is operated by means of a ratchet handle 138 (Fig. 12) provided with a spring pressed pawl 139 engaging a ratchet 140 keyed to the shaft 121.

Water is supplied to the trough by means of the outlet pipe 141 leading from the tank 142. Water is supplied to the tank from a main or from a large tank 161ª carried by the platform 66 through the inlet pipe 143. This pipe has an upwardly turned end closed by the valve 144, and this valve is operated from the float 145 carried by the valve rod 146 pivoted at 147. The upper end of the outlet pipe 141 is closed by the valve 148 which is in the form of a float whose lower face engages the seat 149 surrounding the upper end of the pipe 141. The guide for the valve is provided in the form of a pin 150 carried by a spider 151 secured to the bottom of the member 149. The valve 148 has a sleeve 152 which fits over this pin so that it is guided in its vertical movements. Carried by the upper end of the valve 148 is a rest or seat 153 for engaging the float 145 when the valve 148 is opened. The valve 148 is opened from the cable or chain 154 which is attached to the outer end of the lever 155, such lever being provided with a counter-weight 154ª and being connected at its inner end to the lever 155 by means of the rod 156. The lever 155 has its free end forked as indicated at 156ª and this forked end engages pins 157 (Fig. 11) projecting laterally from the sides of the valve 148. When the chain 154 is pulled downwardly, the valve 148 is lifted and the rest 153 engages the lower side of the float 145. Water in the tank now flows downwardly through the pipe 141 until the level in the tank has dropped to a point such that the valve 148 will seat itself, and during this period of emptying, the valve 144 is held closed because of the support afforded the float 145 by the seat or rest 153 carried by the float valve 148. In this manner, the quantity of water supplied is accurately controlled since there is no inflow into the tank during the period of discharge therefrom. This function is secured by reason of the support of the float 145 by the float valve 148, as otherwise, the float 144 would open as soon as the level of the water in the tank began to drop. In operating the apparatus, the plaster valve is first rotated to discharge a measured quantity of plaster into the trough 123, after which the chain 154 is pulled, permitting a supply of water to the trough sufficient to make a mixture of the right consistency. The mechanism for rotating the shaft 124 is then started so that the paddle 126 revolves, thoroughly mixing the plaster and water, after which the handle 135 is pulled out and the trough rotated to discharge onto the table. At the same time, the platform is moved longitudinally of the tracks so that the mixture of plaster and water is distributed over the length of the car.

The means for pressing the sheet of glass down into the plaster consists of the rolls 158 shown in Figs. 7 and 8, such rolls being guided for vertical movement with respect to the platform by means of a guide frame 159 which engages the frame 160 in which the rolls are mounted. The frame 160 may be moved up and down and the pressure of such rolls governed by means of the air cylinder 161 whose plunger 162 is provided with a piston rod 163 connected at its lower end to the frame 160. Any other desired means may be employed for governing the movement of the frame 160 and the weight of the frame and rolls may be made such as to apply just the desired amount of pressure to the glass. The rolls are applied to the glass by moving the platform to the left so as to carry them over the glass sheet (Fig. 8), which is applied by means of the vacuum frame after the discharge of plaster to the table.

Fig. 13 shows the power means for moving the crane, including the platform 66 and the apparatus carried thereby, along the crane runway or track 67. Two motors are employed for this purpose, the main shifting motor 163 which is of the series wound type for moving the crane back and forth along the runway independent of the movement of the cars or tables 1 and 3, and an auxiliary motor 164, which is of the shunt wound constant speed type, for giving the crane a forward movement which is exactly the same as that of the cars or tables which move forward continuously during the operation of laying the glass on the tables 1. This constant forward movement of the cars is relatively slow, corresponding, of course, to the speed at which the cars are moving beneath the series of grinding and polishing machines. It will be understood that any desired means may be employed for giving the cars this uniform forward movement. The two motors operate through a differential 165 so that the motor 163 can operate to shift the crane in either direction without stopping the motor 164, such latter motor being allowed to operate continuously, so that when the operation of the motor 163 is discontinued, the motor 164 automatically takes up the work of moving the crane forward at the same speed as the glass carrying cars therebeneath, thus relieving the operator of moving switches to stop and start the auxiliary motor, such as would be required, if separate motors without the differential were employed. Worm reducing gearing is preferably employed between the auxiliary motor and the differential, with the worm of a pitch such that the worm wheel cannot be rotated backwardly from the worm. This prevents the shifting motor from running the auxiliary motor backward instead of moving the crane when the auxiliary motor is not running. The main driving motor is equipped with the usual magnetic brake to stop it quickly so that it will not be run backwardly (when not operating) by the auxiliary motor.

Referring to Fig. 13, 166 is a shaft extending transversely of the crane and carrying the crane wheels 167. This shaft is provided with the spur gear 168 driven from both motors 163 and 164 through the intermediary of the differential 165, which may be of any approved form. As illustrated, this differential comprises a pair of shafts 169 and 170, the first of which has keyed to its outer end, the spur gear 171 driven from the pinion 172 of the main shifting motor 163, while the second of which has keyed to its outer end the worm wheel 173 driven from the worm 174 carried by the shaft of the motor 164. The two shafts have the bevel gears 175 and 176 integral with their inner ends, and these gears mesh with the bevel pinions 177 and 178 mounted on the shaft 179. This shaft is carried in suitable bearings in the spider 180, such spider having integral therewith the sleeves 181 and 182, the latter of which has keyed to it, the pinion 183 which drives the gear 168 keyed to the shaft 166.

The motor 164 is of the shunt wound constant speed type, and is set so as to drive the crane forwardly through the differential gear (when the motor 163 is not operating) at the same speed at which the cars beneath the crane are moving, thus facilitating the glass lifting and laying operations. At such time the magnetic brake 184 on the shaft of the motor 163 prevents such shaft from being run backwardly. On the other hand, the motor 163 can, by reason of the differential, run the crane back and forth without any interference from the continuous drive of the motor 164, such motor, of course being adapted to run at a much higher speed than the motor 164, so that the crane can be moved backwardly despite the constant forward drive of such motor 164. The operator is, therefore, relieved of the work of stopping and starting the constant speed motor, as would be the case, if it were not for the differential. The pitch of the worm 174 is such that such worm acts as a lock to prevent the backward rotation of the worm wheel when the motor 163 is operating and the current to the motor 164 is cut off, thus dispensing with the requirement of a brake or some equivalent device to prevent the rotation of the shaft 170 under such conditions, as such rotation would, of course, render the motor 163 ineffective to move the crane in either direction.

The guide frames 68 and 69 and pipes 70 and 71 are arranged so as to definitely position the suction frames 72 and 73 over the longitudinal center lines of the tables, but at the same time they have sufficient give to permit the operator to move the frames a slight distance laterally or endwise, if it becomes desirable or necessary. This involves an advantage in this, and in other arrangements involving the use of vacuum frames, in seating the glass sheet on the tables after being turned over, in case the center line of the sheet is not brought to exactly the right position by the operator of the crane, particularly where the tables are provided with side and end strips between which the glass must fit. Under these conditions, the operator can apply the necessary force to spring this frame slightly and bring the glass sheet into its proper position with respect to the table or car.

What I claim is:

1. In combination in apparatus for transferring glass sheets from one car or carrier mounted on a track to another car or carrier on a parallel track and turning them over, which comprises a vacuum lifting frame mounted for vertical movement over each track, and a turnover frame mounted for lateral movement between the two frames, and adapted in its two extremes of movement to lie beneath said frames.

2. In combination in apparatus for transferring glass sheets from one car or carrier mounted on a track to another car or carrier on a parallel track and turning them over, which comprises a vacuum lifting frame mounted for vertical movement over each track, and a turnover frame in two parts hinged together mounted for lateral movement between the two frames, means for opening and closing the turnover frame and for tilting it, when in closed position so that it is inclined to the vertical, and means for moving the frame laterally so that in one extreme of movement it lies beneath one vacuum frame and in its other extreme of movement it lies beneath the other vacuum frame.

3. In combination in apparatus for transferring glass sheets from one car or carrier mounted on a track to another car or carrier on a parallel track and turning them over, which comprises a vacuum lifting frame mounted for vertical movement over each track, a turnover frame mounted for lateral movement between the tracks, so that in one extreme of movement, it lies beneath one vacuum frame and in another extreme of movement it lies beneath the other vacuum frame, and means operated by a vertical movement of approach between the first vacuum frame and the glass to be transferred for applying suction to the cups to cause their attachment to the glass.

4. In combination in apparatus for transferring glass sheets from one car or carrier mounted on a track to another car or carrier on a parallel track and turning them over, which comprises a vacuum lifting frame mounted for vertical movement over each track, a turnover frame mounted for lateral movement between the tracks, so that in one extreme of movement it lies beneath one vacuum frame and in another extreme of movement it lies beneath the other vacuum frame, means operated by a vertical movement of approach between the first vacuum frame and the glass to be transferred for applying suction to the cups to cause their attachment to the glass, and automatic means for causing the release of the cups when the turnover frame reaches a position beneath the glass sheet carried by said first vacuum frame.

5. In combination in apparatus for transferring glass sheets from one car or carrier mounted on a track to another car or carrier on a parallel track and turning them over, which comprises a vacuum lifting frame mounted for vertical movement over each track, a turnover frame mounted for lateral movement between the tracks, so that in one extreme of movement it lies beneath one vacuum frame and in another extreme of movement it lies beneath the other vacuum frame, means operated by a vertical movement of approach between the second vacuum frame and the glass carried by the turnover frame for securing the application of suction to the cups of such frame to cause their attachment to the glass, and automatic means for causing the release of the cups after the turnover frame has been moved from beneath said second vacuum frame and such vacuum frame has been lowered to deposit the glass on the carrier.

6. In combination in apparatus for transferring glass sheets from one car or carrier mounted on a track to another car or carrier on a parallel track and turning them over, which comprises a turnover frame in two parts hinged together and opening upwardly mounted between the tracks for lateral movement, and means for moving the parts of the frame from an open horizontal position to a closed upright position.

7. In combination in apparatus for transferring glass sheets from one car or carrier mounted on a track to aonther car or carrier on a parallel track and turning them over, which comprises a turnover frame in two parts hinged together and opening upwardly mounted between the tracks for lateral movement, and means for moving the parts of the frame from an open horizontal position to a closed upright position somewhat inclined to the vertical.

8. In combination in apparatus for transferring glass sheets from one car or carrier mounted on a track to another car or carrier on a parallel track and turning them over, which comprises a turnover frame in two parts hinged together and opening upwardly mounted between the tracks for lateral movement, means for moving the parts of the frame from an open horizontal position to a closed upright position, means for lifting the glass sheets from the cars or carriers on the track and depositing them on the turnover frame, and means for lifting the glass sheets from the turnover frame and depositing them on the cars or carriers on the other track.

9. In combination in apparatus for transferring glass sheets from a car or carrier, which comprises a vacuum lifting frame mounted for vertical movement above the car, a motor and crank means operated thereby arranged to give the frame an up and down movement upon each forward rotary movement of the crank, and a transfer device for receiving the glass sheet carried by the frame when the frame is in its upper position, said transfer device being mounted for lateral movement from a position at one side of the car to a position between the table and the glass sheet supported on the frame.

10. In combination in a system for surfacing sheet glass having a track with forwardly moving cars or tables thereon carrying glass sheets, a crane mounted above the tracks, means carried by the crane and including a vacuum frame for placing the glass sheets on the cars, and a depending supporting frame carried by the crane arranged to definitely position the vacuum frame centrally with respect to the cars upon which the glass sheets are to be placed, but having enough give or flexibility, to permit the frame to be more exactly positioned by hand.

In testimony whereof, I have hereunto subscribed my name this 1st day of March, 1924.

HALBERT K. HITCHCOCK.